(12) United States Patent
Scott

(10) Patent No.: US 10,163,531 B2
(45) Date of Patent: Dec. 25, 2018

(54) REACTIVITY CONTROL IN A MOLTEN SALT REACTOR

(71) Applicant: Ian Richard Scott, Warwickshire (GB)

(72) Inventor: Ian Richard Scott, Warwickshire (GB)

( * ) Notice: Subject to any disclaimer, the term of this patent is extended or adjusted under 35 U.S.C. 154(b) by 0 days.

(21) Appl. No.: 15/516,839

(22) PCT Filed: Mar. 9, 2015

(86) PCT No.: PCT/GB2015/050673
§ 371 (c)(1),
(2) Date: Apr. 4, 2017

(87) PCT Pub. No.: WO2016/059364
PCT Pub. Date: Apr. 21, 2016

(65) Prior Publication Data
US 2017/0243664 A1 Aug. 24, 2017

(30) Foreign Application Priority Data

Oct. 12, 2014 (GB) .................................. 1418030.1
Oct. 27, 2014 (GB) .................................. 1419068.0

(51) Int. Cl.
*G21C 7/22* (2006.01)
*G21C 1/03* (2006.01)
(Continued)

(52) U.S. Cl.
CPC .................. *G21C 7/22* (2013.01); *G21C 1/03* (2013.01); *G21C 1/14* (2013.01); *G21C 3/54* (2013.01);
(Continued)

(58) Field of Classification Search
CPC ... G21C 7/22; G21C 7/24; G21C 3/54; G21C 15/28; G21C 19/28
(Continued)

(56) References Cited

U.S. PATENT DOCUMENTS 3,278,387 A * 10/1966 McNeese ............... G21C 19/50
376/360
9,368,244 B2 * 6/2016 Woolley ................... G21C 1/30
(Continued)

FOREIGN PATENT DOCUMENTS

| DE | 10 2012 007933 A1 | 10/2013 |
|----|-------------------|---------|
| GB | 2508537 A | 6/2014 |
| JP | 2014-119429 A | 6/2014 |

OTHER PUBLICATIONS

Ham, "Role of Thorium as a Shim Control Material in the AMBIDEXTER-NEC", Korean Nuclear Society Spring Meeting, May 2007. (Year: 2007).*

(Continued)

*Primary Examiner* — Jack W Keith
*Assistant Examiner* — Daniel Wasil
(74) *Attorney, Agent, or Firm* — Renner, Otto, Boisselle & Sklar, LLP

(57) ABSTRACT

Methods of controlling the reactivity of a molten salt fission reactor. The molten salt fission reactor comprises a core and a coolant tank (101), the core comprising fuel tubes (103) containing a molten salt fissile fuel, and the coolant tank containing a molten salt coolant (102), wherein the fuel tubes are immersed in the coolant tank. The methods comprise dissolving a neutron absorbing compound in the molten salt coolant, the neutron absorbing compound comprising a halogen and a neutron absorbing element. The first method further comprises reducing the neutron absorbing compound to a salt of the halogen and an insoluble substance comprising the neutron absorbing element, the halogen being fluorine or chlorine, wherein the insoluble substance is not volatile at a temperature of the coolant during operation of the reactor. In the second method the one or more neutron absorbing compounds are chosen such that reduction of the neutron absorbing capacity of the one or more (Continued)

neutron absorbing compounds due to absorption of neutrons compensates for a fall in reactivity of the core in order to control fission rates in the core. Apparatus for implementing the methods are also provided.

14 Claims, 2 Drawing Sheets

(51) Int. Cl.
   G21C 1/14 (2006.01)
   G21C 7/04 (2006.01)
   G21C 19/31 (2006.01)
   G21C 3/54 (2006.01)
   G21C 7/24 (2006.01)
   G21C 15/247 (2006.01)

(52) U.S. Cl.
   CPC ............... *G21C 7/04* (2013.01); *G21C 7/24* (2013.01); *G21C 15/247* (2013.01); *G21C 19/31* (2013.01); *G21Y 2004/101* (2013.01); *Y02E 30/34* (2013.01); *Y02E 30/35* (2013.01); *Y02E 30/39* (2013.01)

(58) Field of Classification Search
   USPC .......................................... 376/219, 328, 360
   See application file for complete search history.

(56) References Cited

U.S. PATENT DOCUMENTS

| | | |
|---|---|---|
| 2002/0005357 A1 | 1/2002 | Kondo et al. |
| 2009/0279658 A1* | 11/2009 | Leblanc .................. G21C 1/22 376/360 |
| 2013/0083878 A1 | 4/2013 | Massie et al. |
| 2015/0036779 A1* | 2/2015 | Leblanc .................. G21C 1/322 376/207 |
| 2016/0217874 A1* | 7/2016 | Dewan ..................... G21C 3/54 |

OTHER PUBLICATIONS

Mitachi, "Three-Region Core Design for 200-MW(electric) Molten-Salt Reactor with Thorium-Uranium Fuel", Nuclear Technology, vol. 158 (2007) 348-357. (Year: 2007).*
Ignatiev, "Molten-Salt Reactors: New Possibilities, Problems and Solutions", Atomic Energy, vol. 112, No. 3, Jul. 2012. (Year: 2012).*
Engel, "Conceptual Design Characteristics of a Denatured Molten-Salt Reactor with Once-Through Fueling", ORNL/TM-7207, Jul. 1980. (Year: 1980).*
Shimazu, "Reactivity Control Capability of Fuel-Salt Processing System in a Molten-Salt Breeder Reactor", Journal of Nuclear Science and Technology, 15:6, (1978) 461-465. (Year: 1978).*
Kelmers, "Evaluation of Alternate Secondary (and Tertiary) Coolants for the Molten-Salt Breeder Reactor", ORNL/TM-5325, Apr. 1976. (Year: 1976).*
Shaffer, "Preparation and Handling of Salt Mixtures for the Molten Salt Reactor Experiment", ORNL-4616, Jan. 1971. (Year: 1971).*
Robertson, "Conceptual Design Study of a Single-Fluid Molten-Salt Breeder Reactor", ORNL-4541, Jun. 1971. (Year: 1971).*
Robertson, "Two-Fluid Molten-Salt Breeder Reactor Design Study", ORNL-4528, Aug. 1970. (Year: 1970).*
McCoy. "Materials Development for Molten-Salt Breeder Reactors", ORNL-TM-1854, Jun. 1967. (Year: 1967).*
International Search Report and Written Opinion for corresponding International Application No. PCT/GB2015/050673 dated May 22, 2015.
International Preliminary Report on Patentability for corresponding International Application No. PCT/GB2015/050673 dated Dec. 22, 2016.

* cited by examiner

REACTIVITY CONTROL IN A MOLTEN SALT REACTOR

TECHNICAL FIELD

The present invention relates to control of fission reactions in a molten salt fission reactor. In particular, it relates to reversible methods of controlling the rate of neutron absorption in the reactor.

BACKGROUND

Molten salt nuclear fission reactors are those where the fissile material is present in the form of a molten halide salt, usually chloride or fluoride. A novel design of such reactors was described in GB 2508537, in which the molten fuel salt was held in tubes surrounded by a second molten salt acting as a coolant. Control of reactivity of such reactors was proposed to be by using the negative temperature coefficient of reactivity to allow high temperatures to render the rector subcritical, by use of neutron absorbing control rods or by addition of the neutron absorbing material europium fluoride or cadmium fluoride to the coolant salt.

Both europium fluoride and cadmium fluoride have severe limitations for use as neutron poisons added to the coolant salt. Europium is a strongly electronegative metal which would make reduction of the fluoride to the metal, either electrolytically or chemically, impossible without also reducing less electronegative coolant salt components such as zirconium. Cadmium is relatively easy to reduce to the metal, as set out in GB 2508537, but the metal produced is highly volatile and toxic at the temperature of the coolant salt and would therefore require specialised handling which, in the context of a nuclear reactor, would be complex and expensive.

Europium and cadmium also have substantially lower absorption cross sections for fast neutrons than the boron more conventionally used as a neutron poison making them less useful.

Conventional water cooled and moderated reactors use sodium borate added to the water to reduce reactivity, with the advantage that the borate is easily removed from the water as needed. There would be great advantage to having an analogous method available for the molten salt reactor described in GB 2508537, however borate salts are not chemically compatible with the molten salt of the coolant. Use of boron as the control material is particularly valuable in fast spectrum reactors as the boron has a high neutron absorption cross section even in the fast neutron spectrum.

SUMMARY

According to an aspect of the present invention, there is provided a method of controlling the reactivity of a molten salt fission reactor. The molten salt fission reactor comprises a core and a coolant tank, the core comprising fuel tubes containing a molten salt fissile fuel, and the coolant tank containing a molten salt coolant, wherein the fuel tubes are immersed in the coolant tank. The method comprises dissolving a neutron absorbing compound in the molten salt coolant, the neutron absorbing compound comprising a halogen and a neutron absorbing element. The method further comprises reducing the neutron absorbing compound to a salt of the halogen and an insoluble substance comprising the neutron absorbing element, the halogen being fluorine or chlorine, wherein the insoluble substance is not volatile at a temperature of the coolant during operation of the reactor.

According to a further aspect, there is provided a method of controlling the reactivity of a molten salt fission reactor. The molten salt fission reactor comprises a core and a coolant tank, the core comprising fuel tubes containing a molten salt fissile fuel, and the coolant tank containing a molten salt coolant, wherein the fuel tubes are immersed in the coolant tank. The method comprises dissolving one or more neutron absorbing compounds in the molten salt coolant, wherein the one or more neutron absorbing compounds are chosen such that reduction of the neutron absorbing capacity of the one or more neutron absorbing compounds due to absorption of neutrons compensates for a fall in reactivity of the core in order to control fission rates in the core.

According to a yet further aspect, there is provided apparatus for use in a nuclear fission reactor. The apparatus comprises an inlet, a mixing chamber, a filtration unit, and outlet, and a pump. The inlet is configured to be immersed in a pool of coolant salt of the nuclear fission reactor. The mixing chamber is configured to mix coolant drawn through the inlet with a reducing agent in order to reduce a neutron absorbing compound within the coolant salt into an insoluble substance containing a neutron absorbing element of the neutron absorbing compound, and a salt. The filtration unit is configured to filter the insoluble substance from the coolant salt. The outlet is configured to return the filtered coolant salt to the pool of coolant salt. The pump is configured to cause a flow of coolant salt from the pool through the outlet, then into the mixing chamber, then into the filtration unit, then out of the outlet.

According to a yet further aspect, there is provided apparatus configured to operate in a nuclear fission reactor. The apparatus comprises an anode, a cathode, and a voltage regulator. The anode and cathode, are each configured to be immersed in a coolant salt of the nuclear fission reactor. The voltage regulator is configured to supply a voltage between the anode and cathode sufficient to electrolyse a neutron absorbing compound of the coolant salt and insufficient to electrolyse other components of the coolant salt.

According to a yet further aspect, there is provided a nuclear fission reactor. The nuclear fission reactor comprises a core, a coolant tank, a neutron absorber addition unit, and a reduction unit. The core comprises fuel tubes containing a molten salt fissile fuel. The coolant tank contains a molten salt coolant and the fuel tubes are immersed in the coolant. The neutron absorber addition unit is configured to dissolve a neutron absorbing compound in the molten salt coolant, the neutron absorbing compound comprising a halogen and a neutron absorbing element. The reduction unit is configured to reduce the neutron absorbing compound to a salt of the halogen and an insoluble substance comprising the neutron absorbing element, the halogen being fluorine or chlorine, wherein the insoluble substance is not volatile at a temperature of the coolant during operation of the reactor.

Further aspects and preferred features are defined in the dependent claims.

BRIEF DESCRIPTION OF THE DRAWINGS

Some preferred embodiments will now be described by way of example only and with reference to the accompanying drawings, in which.

DETAILED DESCRIPTION

Figure 1:
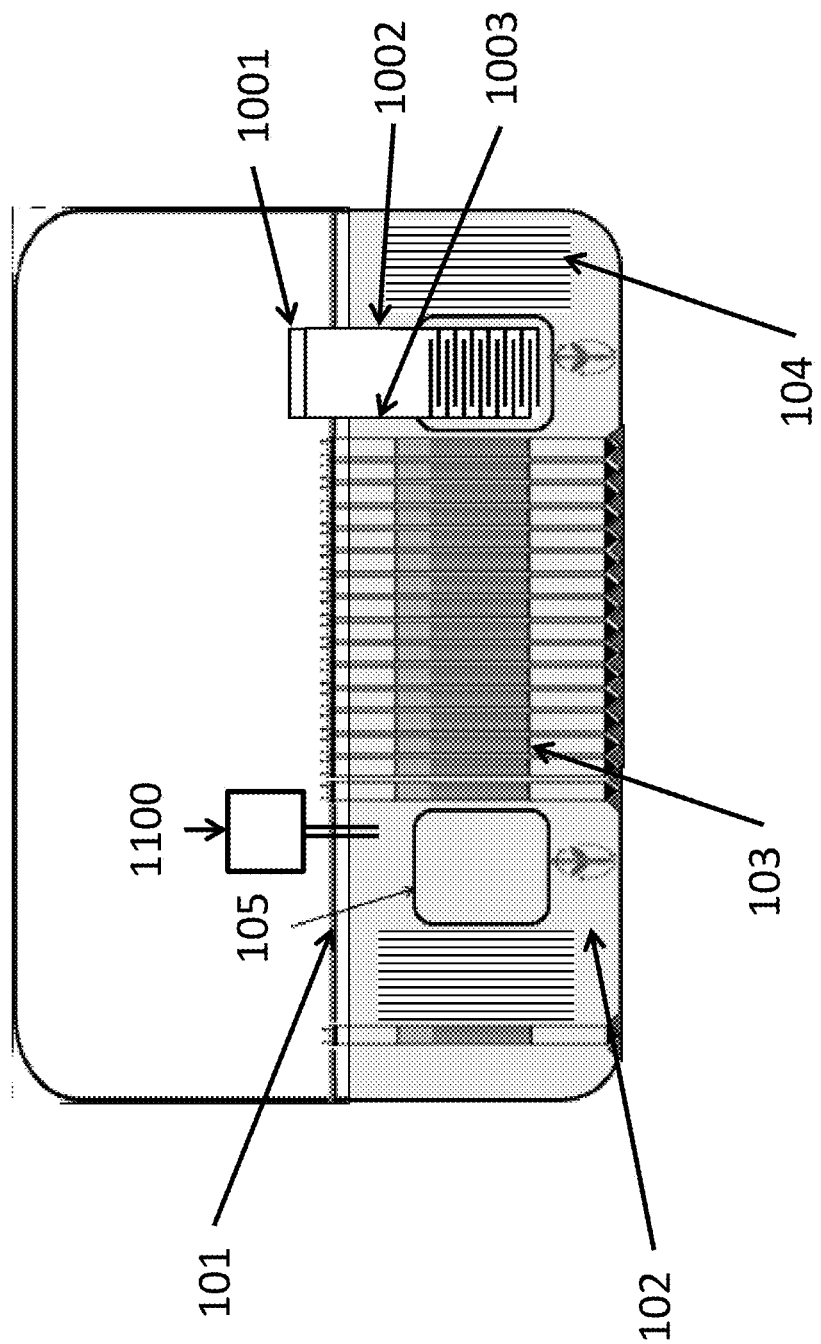
FIG. 1 is a cross section of a reactor incorporating an electrochemical mechanism for removal of a neutron absorber.

It should be noted that, as used in this document, the terms below take the following meanings, which are standard within the chemical field:

Element: A single type of atom (when used to describe a component of a compound) or a chemical formed from a single type of atom (when used to describe a substance).
Compound: A chemical comprising two or more different elements which are bonded together by electrical forces.
Substance: A chemical which cannot be separated into components by physical separation (i.e. without breaking chemical bonds), e.g. a compound, alloy or elemental substance, but not including a mixture.

Reduction of reactivity of the nuclear reaction can be either for the purpose of temporary control of reactivity to compensate, for example, for an initially high reactivity which is expected to fall as fission proceeds and for full shut down of reactivity.

This can be achieved by addition of a neutron absorbing material to the coolant salt. The material must be soluble in the coolant salt. Where temporary control of reactivity is desired, for example acting as a so called "reactivity shim" then a neutron absorbing material whose neutron absorbing properties are reduced after absorbing neutrons can be used so that the neutron absorber is progressively destroyed. Such absorbers are often referred to as burnable poisons Where longer lasting neutron poisons are required then slow burning poisons where the product of neutron absorption by the poison is also a neutron poison can be used. In the reactor described in GB 2508537 A, hafnium contamination of zirconium fluoride in the coolant salt acted as a slow burning poison. The amounts of burnable poisons added can be adjusted in order to ensure that the reduction in neutron absorption by the poisons compensates for the gradual fall in reactivity of the core, mitigating or removing the need for additional reactive material or additional neutron poisons to be added during the lifecycle of the reactor While use of cadmium and europium salts in this way is effective in shutting down the reactor, their use in non-emergency situations is problematical. Europium and hafnium are very reactive metals and cannot readily be removed from the coolant salt by reduction without also reducing the major salts in the coolant, such as zirconium, to their metallic forms. Cadmium is more easily reduced to the metal but, at the temperatures of the coolant salt, metallic cadmium is highly volatile and toxic and would therefore require specialised management which would be challenging in the context of a nuclear reactor.

There is thus a need for more practical ways to control the reactivity of the reactor through addition of material to the coolant, where subsequent removal of the neutron poison from the coolant is practical.

Two groups of chemicals have been found to be able to do this.

First is the group of halides of relatively non reactive metals (Pauling electronegativity >1.5) which can be easily reduced to the metallic form either chemically or electrochemically, which have strong neutron absorption, and which form metals which are solids or non volatile liquids at the temperatures of the reactor. Indium and silver are also useful halides for this purpose, indium being liquid at the temperature of the coolant salt but having very low vapour pressure.

Removal of the neutron poison is by reduction to the metallic form.

For a coolant containing zirconium fluoride this is readily achieved by adding zirconium metal or zirconium difluoride to the coolant salt. For a coolant salt contain thorium tetrafluoride it can be done by adding thorium metal. Other reducing agents can also be used including the reactive group 1 and group 2 metals. The precipitated metal can then be removed by decantation or filtration or can be allow to fall to the bottom of the coolant tank and left indefinitely.

An alternative to chemical reduction of the metal salt is electrochemical reduction where the metal produced can be accumulated as a deposit on the electrode or allowed to accumulate in contact with or in a container below the electrode where the metal is molten at the temperature of the reactor, as is the case with indium.

The second group of chemicals are the sodium (or other group 1 metal) tetrafluoroborates. Sodium tetrafluoroborate is readily soluble in most molten salts. In the case of zirconium fluoride based molten salts it can be produced in situ by addition of borax to the salt which reacts to produce sodium tetrafluoroborate and zirconium oxide. Addition of a reactive metal such as zirconium or thorium to the coolant salt precipitates the boron in the form of a boride such as zirconium boride or thorium boride.

While any metal with sufficient reactivity can be used, including strongly reducing metals such as sodium and potassium and metals of intermediate reactivity such as magnesium and calcium and metals of lower reactivity such as yttrium, scandium, zirconium, titanium and vanadium, metals whose fluorides are already components of the coolant salt such as zirconium or thorium have the advantage of not substantially changing the coolant salt composition. There is a further advantage if the metal added has a reactive lower valence halide, such as zirconium, vanadium and titanium di or trihalides which can either be generated in situ in the coolant salt or added directly instead of the metal. In this instance the reaction producing the metal boride is a solution reaction that proceeds rapidly to completion rather than a heterogeneous reaction between a solid and a liquid which can produce a layer of boride on the solid surface which inhibits further reaction.

The precipitated boride can then be removed by filtration, decantation or other physical process.

A particularly useful variant of these processes is to electrochemically reduce the coolant salt so that a boride based on a suitable metal halide present in the coolant salt such as zirconium or thorium tetrafluoride is formed as a layer on the electrode used. Removal of the precipitated boride is hence simplified and very precise control of the rate of boron removal can be achieved by controlling the electrochemical current density. Reversal of the electrochemical current may also be used to return boron to the coolant salt in a soluble state.

Figure 2:
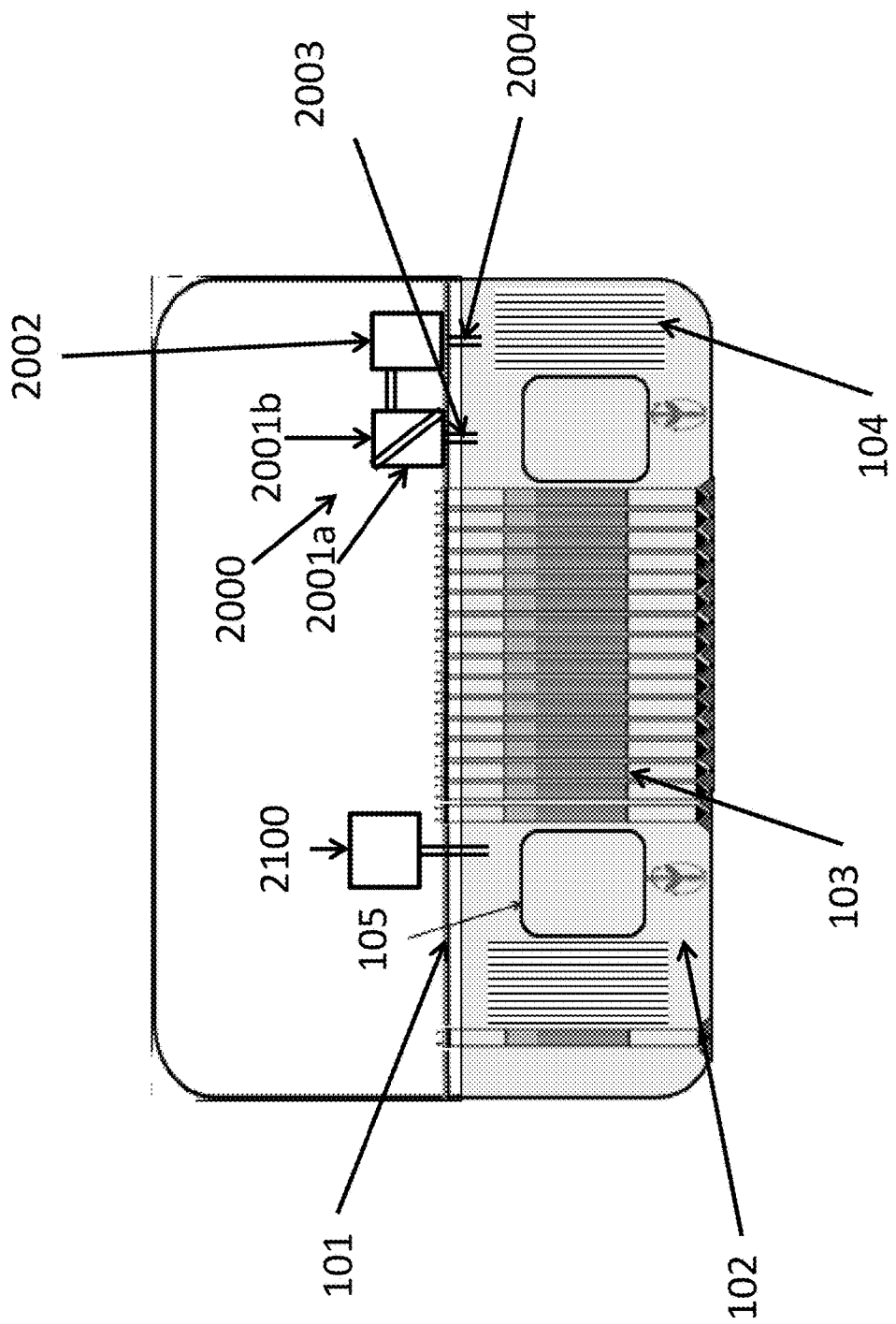
FIG. 2 is a cross section of a reactor incorporating a chemical mechanism for removal of a neutron absorber.

FIGS. 1 and 2 each show a cross section of a reactor according to respective embodiments of the invention. In both figures, the reactor comprises a tank 101 containing coolant salt 102. Fuel tubes 103 are located within the coolant salt, forming the core of the reactor. Heat exchangers 104 withdraw the heat from the coolant salt, and flow baffles 105 are placed to improve convection of the coolant salt.

The reactor of FIG. 1 additionally comprises a reduction unit comprising an electrochemical mechanism for removing a neutron absorber as described above. The electrochemical mechanism comprises a voltage regulator 1001 which may be located outside of the coolant salt, and an anode 1002 and cathode 1003 which are located within the coolant salt. The anode 1002 and cathode 1003 may be connected stacks of rectangular plates interleaved with one another with coolant salt between them. The electrode assembly (i.e. the anode and cathode) may be mounted inside the flow baffle structure in the reactor tank with electrical connections to the voltage regulator 1001. A reducible neutron absorbing compound as described above may then be removed from the coolant salt by applying a voltage across the anode 1002 and cathode 1003, causing electrolysis of the neutron absorbing compound and causing an insoluble substance containing the neutron absorbing element of the neutron absorbing compound to form on the cathode or anode (depending on the chemistry of the neutron absorbing compound). The insoluble substance containing the neutron absorbing element deposits on the relevant electrode and the neutron absorbing compound can be returned to the coolant salt by reversal of the current (reversing the electrolysis), alternatively, the electrode may be extracted and cleaned, and the neutron absorbing compound may be added separately. The flow baffle is perforated to allow mixing of the coolant salt inside the baffle to that in the remainder of the tank.

The reactor of FIG. 2 comprises a mechanism reduction unit 2000 for removal of a neutron absorbing compound as described above by chemical reduction. The mechanism comprises an intake tube 2003, a pump 2001a and reducing agent mixing apparatus chamber 2001b, a filter filtration unit 2002, and a return tube 2004. Coolant salt containing the neutron absorbing compound is drawn up through the intake tube 2003 by the pump, and mixed with a reducing agent in the reducing agent mixing apparatus 2001. The reducing agent is selected in order to reduce the neutron absorbing compound into an insoluble substance comprising the neutron absorbing element and a salt comprising the non-neutron absorbing elements. The insoluble substance is then filtered out in the filter 2002. The filter 2002 may be, for example, a centrifugal filter. Alternatively, the filter 2002 may be a sedimentation tank, or any other suitable filter depending on the properties of the insoluble substance. The filtered coolant salt is then returned to the reactor tank via the return tube 2004.

The reactors of FIG. 1 and FIG. 2 may comprise neutron absorber addition units 1100, 2100 configured to dissolve the neutron absorbing compound in the molten salt coolant.

The invention claimed is:

1. A method of controlling the reactivity of a molten salt fission reactor, wherein the molten salt fission reactor comprises a core and a coolant tank, the core comprising fuel tubes containing a molten salt fissile fuel, and the coolant tank containing a molten salt coolant, wherein the fuel tubes are immersed in the coolant tank, the method comprising:
dissolving a neutron absorbing compound in the molten salt coolant, the neutron absorbing compound comprising a halogen and a neutron absorbing element; and
reducing the neutron absorbing compound to a salt of the halogen and an insoluble substance comprising the neutron absorbing element, the halogen being fluorine or chlorine, wherein the insoluble substance is insoluble in the molten salt coolant and not volatile at a temperature of the coolant during operation of the reactor,
wherein the neutron absorbing element has a Pauling electronegativity of greater than 1.5 and is a neutron absorber.

2. The method of claim 1, wherein the step of reducing the neutron absorbing compound comprises adding a reducing agent to the molten salt coolant.

3. The method of claim 1, wherein the step of reducing the neutron absorbing compound comprises electrochemical reduction of the neutron absorbing compound.

4. The method of claim 1, further comprising extracting the insoluble substance from the coolant.

5. The method of claim 4, wherein extracting the insoluble substance comprises any one or more of:
withdrawing the insoluble substance from the top or bottom of the coolant;
filtration;
sedimentation;
centrifugation;
sparging with inert gas.

6. The method of claim 3, further comprising extracting the insoluble substance from the coolant, wherein the step of removing the insoluble substance comprises collection of the insoluble substance on an electrode.

7. The method of claim 1, wherein the neutron absorbing compound is a metal halide, the neutron absorbing element being a metal, and the insoluble substance being the pure metal or an insoluble salt of the metal.

8. The method of claim 7, wherein the metal is any one of indium and silver.

9. The method of claim 1, wherein the neutron absorbing compound is a haloborate salt, the haloborate being fluoroborate or chloroborate, the neutron absorbing element is boron, and the insoluble substance is an insoluble boride.

10. The method of claim 2, wherein the neutron absorbing compound is a haloborate salt, the haloborate being fluoroborate or chloroborate, the neutron absorbing element is boron, the insoluble substance is an insoluble boride and the reducing agent is thorium, zirconium or zirconium difluoride.

11. A nuclear fission reactor comprising:
a core comprising fuel tubes containing a molten salt fissile fuel;
a coolant tank containing a molten salt coolant, wherein a neutron absorbing compound is dissolved in the molten salt coolant, the neutron absorbing compound comprising a halogen, the halogen being fluorine or chlorine, and a neutron absorbing element;
wherein the fuel tubes are immersed in the coolant; and
a reduction unit configured to reduce the neutron absorbing compound to a salt of the halogen and an insoluble substance comprising the neutron absorbing element wherein the insoluble substance is insoluble in the molten salt coolant and not volatile at a temperature of the coolant during operation of the reactor;
wherein the neutron absorbing element has a Pauling electronegativity of greater than 1.5.

12. A nuclear fission reactor according to claim 11, and comprising a neutron absorber addition unit configured to dissolve a neutron absorbing compound in the molten salt coolant, the neutron absorbing compound comprising a halogen and a neutron absorbing element.

13. A nuclear fission reactor according to claim 11 wherein the reduction unit comprises:
an inlet configured to be immersed in a pool of coolant salt of the nuclear fission reactor;
a mixing chamber configured to mix coolant drawn through the inlet with a reducing agent in order to reduce a neutron absorbing compound within the coolant salt into an insoluble substance containing a neutron absorbing element of the neutron absorbing compound, and a salt;

a filtration unit configured to filter the insoluble substance from the coolant salt;

an outlet configured to return the filtered coolant salt to the pool of coolant salt; and a pump configured to cause a flow of coolant salt from the pool through the outlet, then into the mixing chamber, then into the filtration unit, then out of the outlet.

14. A nuclear fission reactor according to claim 11, wherein the reduction unit comprises:

an anode and a cathode, each of which is immersed in the coolant; and a voltage regulator configured to supply a voltage between the anode and cathode sufficient to electrolyse the neutron absorbing compound and insufficient to electrolyse other components of the molten salt coolant.

* * * * *